United States Patent Office 2,877,864
Patented Mar. 17, 1959

2,877,864
SEPARATION OF BORON TRICHLORIDE

Thomas M. Cromwell, Covina, and Glenn H. McIntyre, Jr., Monterey Park, Calif., assignors to United States Borax & Chemical Corporation, Los Angeles, Calif., a corporation of Nevada No Drawing. Application September 9, 1957
Serial No. 682,631

3 Claims. (Cl. 183—115)

This invention relates to an improved method of obtaining boron trichloride by reaction of chlorine gas, carbon and an anhydrous boron source such, for example, as boric oxide or sodium or calcium borate.

The invention relates more particularly to improved methods for separating the boron trichloride produced by a reaction of that type from the other gaseous products of the reaction.

The principal gaseous products of that type of reaction are boron trichloride and carbon monoxide in a theoretical molar ratio of 2:3, in accordance with the formula:

$$B_2O_3 + 3C + 3Cl_2 = 2BCl_3 + 3CO$$

In actual practice, some of the carbon monoxide is further oxidized to carbon dioxide, slightly reducing the ratio of carbon actually consumed per mole of boric oxide. The gaseous product also typically contains small concentrations of other gases, such for example, as unreacted chlorine, carbon oxychloride ($COCl_2$), commonly known as phosgene, and hydrogen chloride resulting from moisture or other hydrogen-containing impurities in the solid reactants.

A primary object of the present invention is to provide a more effective and economical method of isolating boron trichloride from other gases, particularly carbon monoxide and carbon dioxide.

We have discovered that such isolation can be accomplished remarkably effectively and economically by differential solution of the boron trichloride in a suitable organic solvent, followed by release of the dissolved boron trichloride from the solvent. Such procedure requires a solvent which has the special property of dissolving a high concentration of boron trichloride from the gaseous phase under suitable and readily obtainable conditions, and which dissolves relatively little carbon monoxide or carbon dioxide under the same conditions. Moreover, the solvent must release a large proportion of the dissolved boron trichloride under another readily attainable set of conditions. The solvent must further be substantially inert with respect to boron trichloride, to avoid decomposition and loss of both solvent and product and to prevent contamination of the remaining boron trichloride with decomposition products. The solvent must further be readily distillable without appreciable decomposition, and yet have a vapor pressure, under the conditions employed for release of boron trichloride, which is low enough to prevent significant contamination of the released product with solvent.

We have discovered that all of those conditions can, in fact, be met by a number of solvents, and that differential solution in such solvents provides a remarkably economical and convenient method of recovering boron trichloride from carbon monoxide and carbon dioxide.

In accordance with the invention, such differential solution of boron trichloride can be carried out effectively with fluorinated or chlorinated benzenes and diphenyls; and with fluorinated or chlorinated aliphatic solvents containing from two to about twelve carbon atoms and at least two halogen atoms per molecule. Illustrative aromatic solvents of the described type include, for example, halogenated benzenes, such as dichlorobenzene, trichlorobenzene and fluochlorobenzene; and halogenated diphenyls such as polychlorinated diphenyl. Illustrative aliphatic solvents in accordance with the invention include, for example, fluorinated or chlorinated paraffinic configurations containing between two and about twelve carbon atoms, such as tetrachloroethane, pentachloroethane, difluorotetrachloroethane, dichloropentane and highly halogenated longer chain aliphatics resulting from polymerization of such compounds as trifluorovinylchloride.

The conditions under which solvents of the described type have been found to preferentially absorb boron trichloride with maximum effectiveness are relatively low temperature and high pressure. The lowest possible temperatures consistent with proper fluidity of the solvent, and pressures up to ten or fifteen atmospheres are ordinarily satisfactory. Optimum conditions for any particular solvent may be determined under actual operation.

Absorption of the boron trichloride from gaseous phase may be carried out in a typical counter-current extractor consisting of a packed column with inlet and outlet gas and liquid ports. The rate of flow of the gas and fluid streams is preferably adjusted with respect to such factors as the surface area of contact provided by the extractor, to permit substantial equilibrium to be attained between the two phases.

The charged solvent leaving the extractor typically contains from about 10 to about 50% or more by weight of dissolved boron trichloride, depending upon the particular solvent used and the operating conditions during extraction. The concentration of dissolved carbon monoxide and carbon dioxide in the charged solvent is typically only one or two percent of the boron trichloride concentration.

As an example of the selective solution of boron trichloride from a gaseous mixture, when trichlorobenzene is contacted with such a mixture by counter-current flow in a packed column the boron trichloride can be extracted substantially quantitatively. For example, at a flow rate of 2300 gm./hr. of trichlorobenzene and a gas flow rate computed to give 240 gm./hr. of boron trichloride through a column operated at atmospheric pressure and at about 25° C., the solution obtained at the bottom of the extractor was found to contain about 11% boron trichloride by weight in trichlorobenzene. Correspondingly higher concentrations may be obtained by operation at elevated pressures.

The dissolved boron trichloride may be released from the charged solvent by passing the latter through a second packed column which is operated as a distillation column or flash stripper under suitable conditions of temperature and pressure. The solvent is preferably fed to the column at such rate that substantial equilibrium is established between liquid and gas phases both at the point of solvent withdrawal, to release a maximum proportion of the dissolved boron trichloride, and at the exit gas stream at the head of the column, to reduce loss of solvent as vapor in the boron trichloride product. The stripper may be operated at reduced pressure, for example at ½ to 1/10 atmosphere, or even down to a pressure of a few millimeters of mercury. Such pressure increases the rate of removal of boron trichloride and reduces the equilibrium concentration of dissolved boron trichloride at the existing temperature. That temperature is typically selected to give minimum practicable solubility of boron trichloride. The working temperature should, however, be low enough to avoid possibility of reaction of boron trichloride with the solvent, and to prevent excessive vapor pressure of the solvent in the boron trichloride product.

As an illustration of the recovery of boron trichloride from solution in an organic solvent of the present type, trichlorobenzene containing about 16% boron trichloride by weight was passed into a packed distillation column maintained under a total pressure of 0.1 atmosphere. At a pot temperature of about 130° C. and a head temperature of about 25° C., and at a flow rate of about 6 pounds of solution per hour, all but about 0.2% of the contained boron trichloride was recovered from the solvent and no trichlorobenzene was found in the overhead gas stream.

Particulars of the various procedures for carrying out the invention have been described only as illustration. Such particulars may be varied in many respects without departing from the true scope of the invention, which is defined in the appended claims.

We claim:

1. The method of separating boron trichloride from a gaseous mixture containing boron trichloride and carbon monoxide which comprises contacting said gaseous mixture with a liquid organic solvent to selectively absorb boron trichloride from said gaseous mixture, said solvent selected from the group consisting of chlorinated benzenes, fluorinated benzenes, chlorinated diphenyls, fluorinated diphenyls, chlorinated aliphatic hydrocarbons having from 2 to about 12 carbon atoms, and fluorinated aliphatic hydrocarbons having from 2 to about 12 carbon atoms, isolating the resulting solution from the undissolved gaseous portion and recovering boron trichloride from the isolated solution.

2. The method defined in claim 1, and in which said organic solvent is trichlorobenzene.

3. The method defined in claim 1, and in which said organic solvent is a chlorinated diphenyl.

References Cited in the file of this patent

UNITED STATES PATENTS

| | | |
|---|---|---|
| 2,311,466 | Pechukas | Feb. 16, 1943 |
| 2,540,905 | Neubauer et al. | Feb. 6, 1951 |